(No Model.) 5 Sheets—Sheet 2.
F. E. KINSMAN.
AUTOMATIC ELECTRIC CONTROLLER FOR RAILROAD TRAINS.
No. 405,964. Patented June 25, 1889.
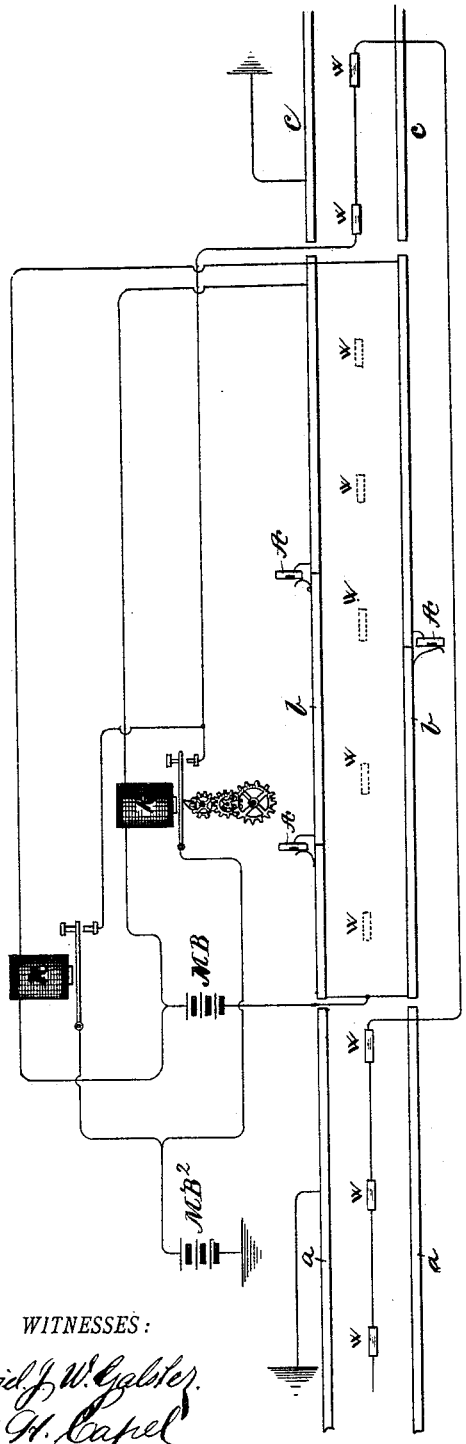
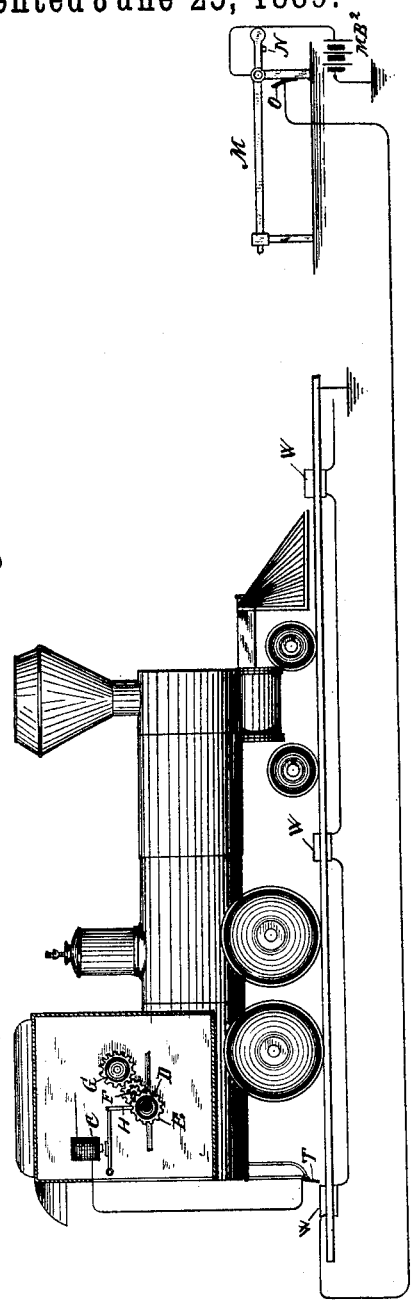
WITNESSES:
INVENTOR
Frank E. Kinsman.
BY
H. C. Townsend
ATTORNEY

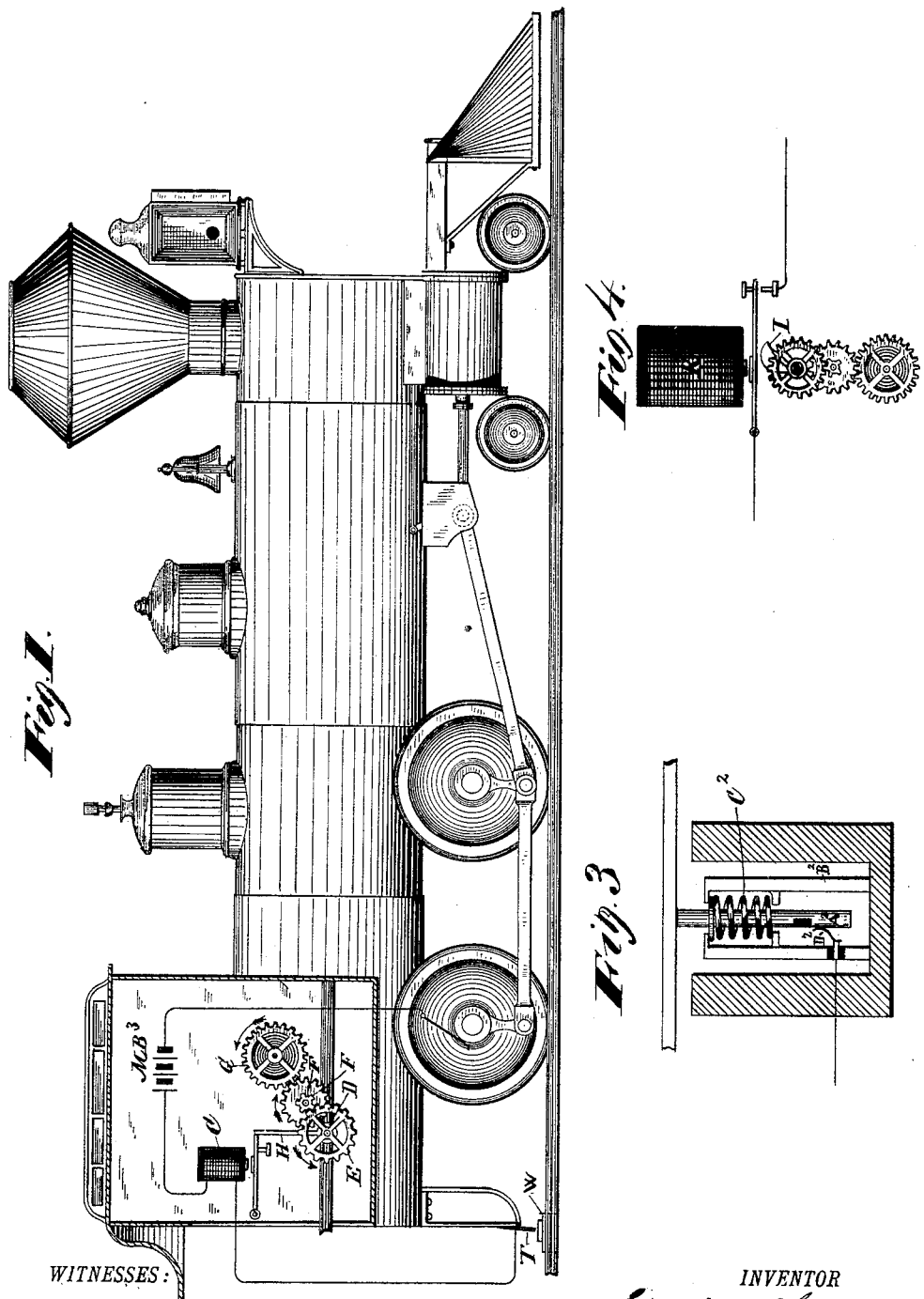

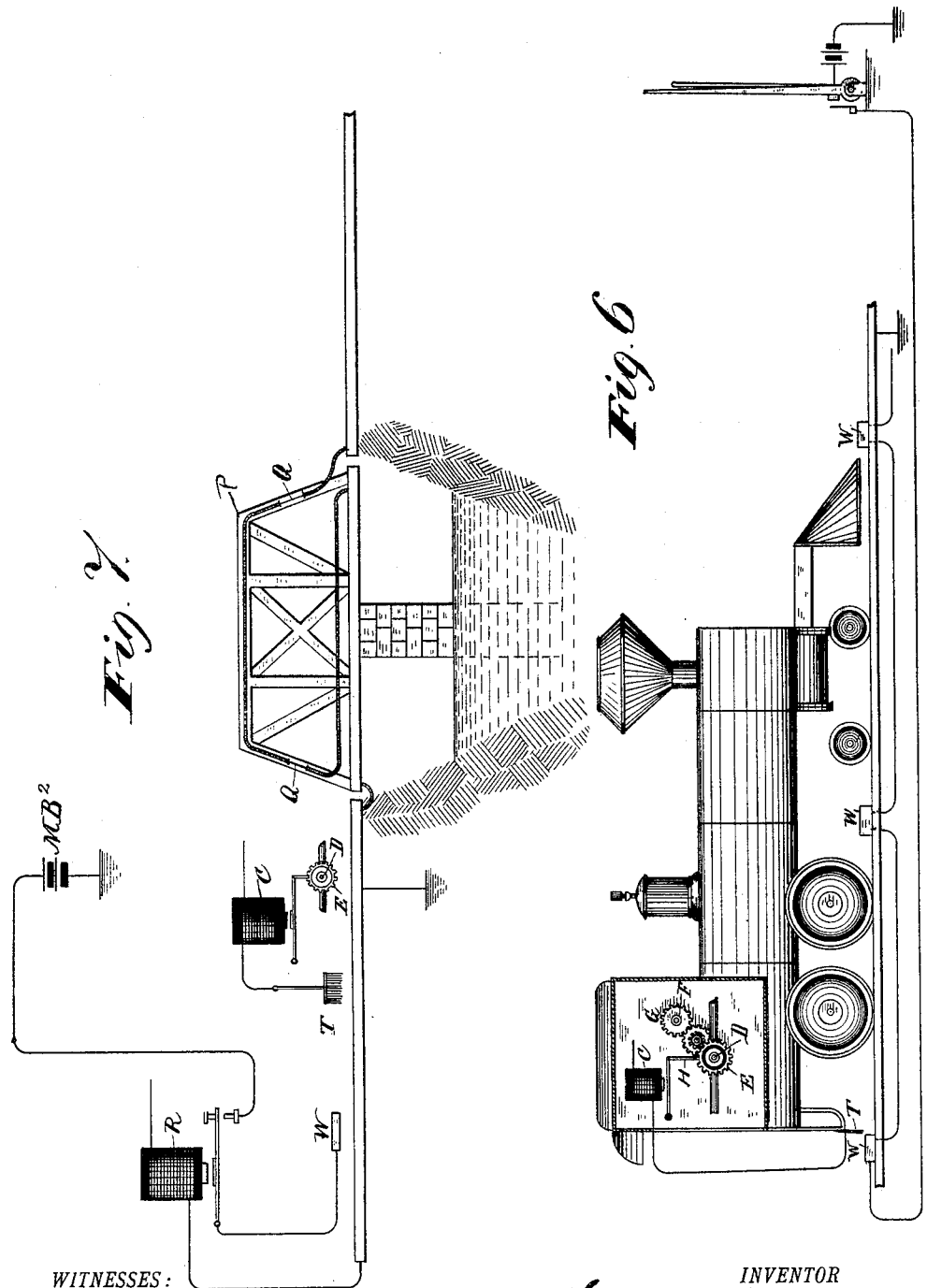

(No Model.) 5 Sheets—Sheet 4.
F. E. KINSMAN.
AUTOMATIC ELECTRIC CONTROLLER FOR RAILROAD TRAINS.
No. 405,964. Patented June 25, 1889.
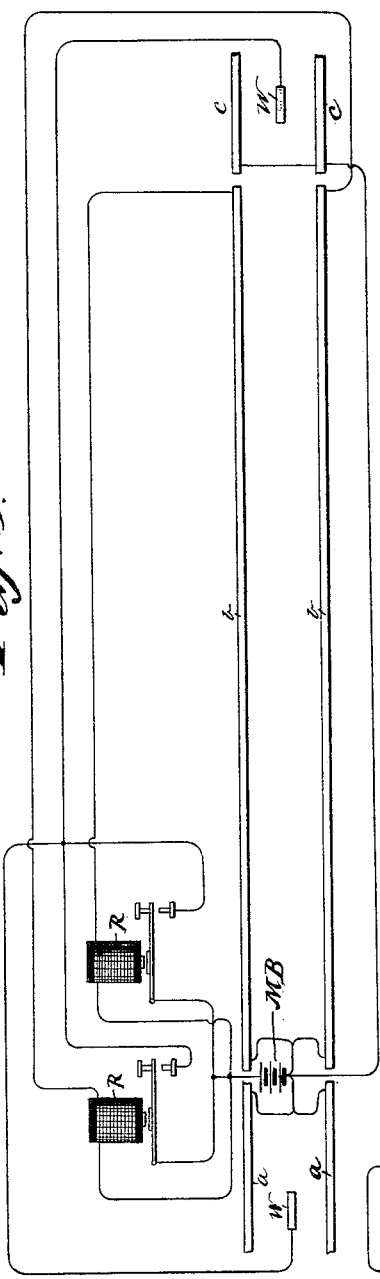
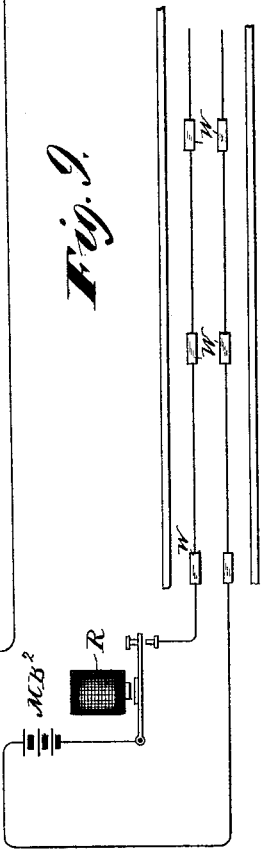
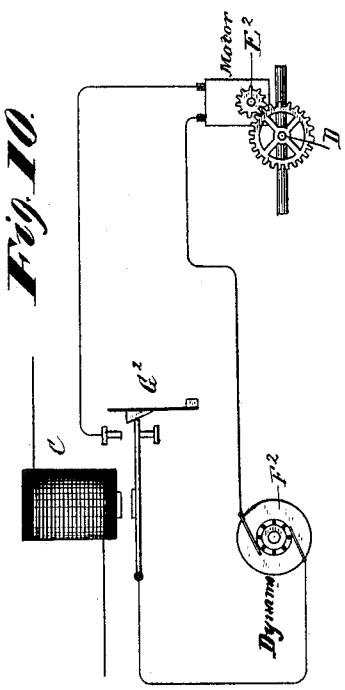
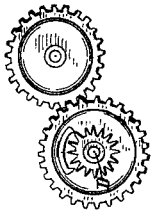
WITNESSES:
INVENTOR
Frank E. Kinsman
BY
ATTORNEY (No Model.)

Figures 11, 12:
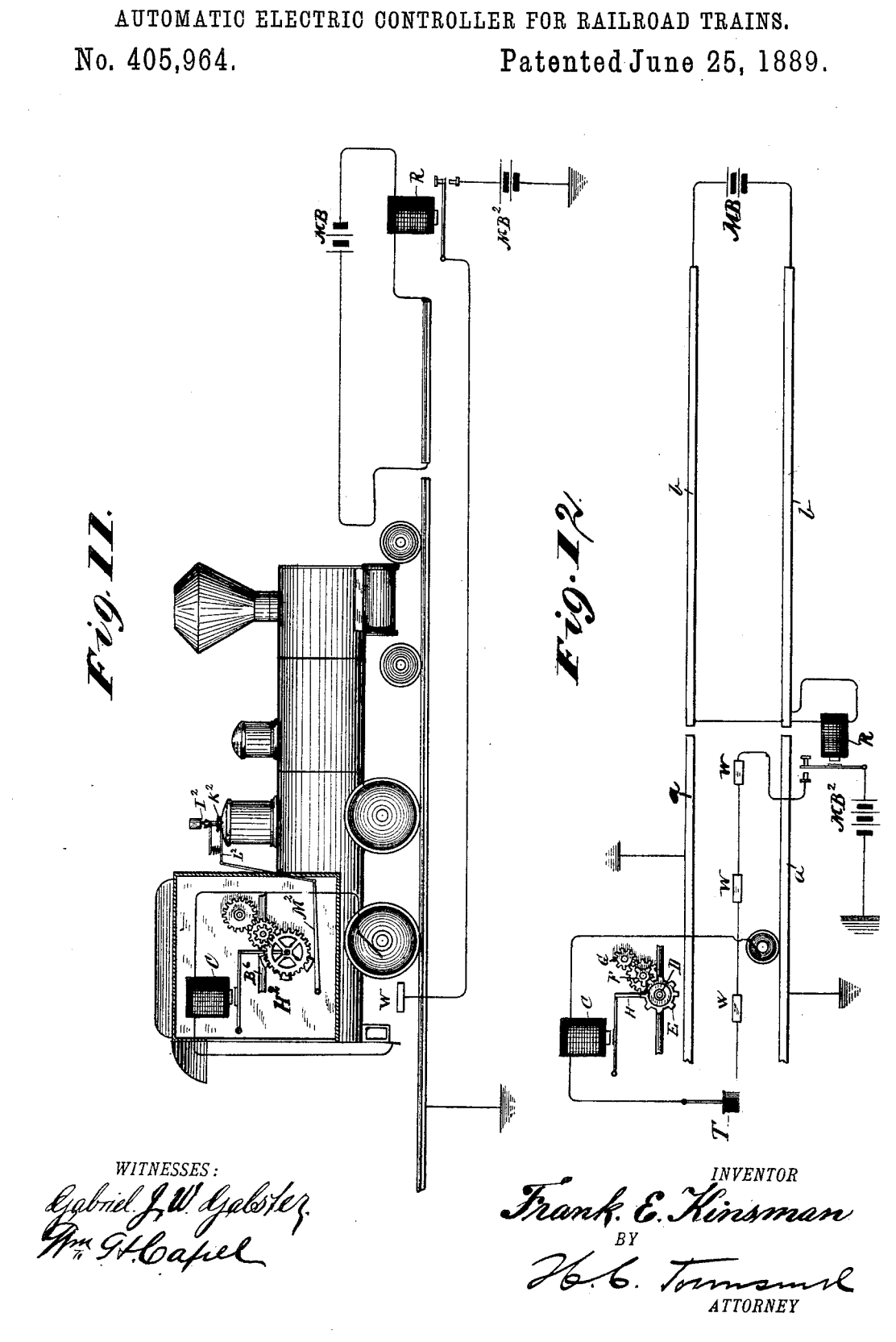

F. E. KINSMAN.
AUTOMATIC ELECTRIC CONTROLLER FOR RAILROAD TRAINS.

No. 405,964. Patented June 25, 1889.

WITNESSES:
Gabriel J. W. Galster
Wm. H. Capel

INVENTOR
Frank E. Kinsman
BY
H. C. Townsend
ATTORNEY

UNITED STATES PATENT OFFICE.

FRANK E. KINSMAN, OF NEW YORK, N. Y.

AUTOMATIC ELECTRIC CONTROLLER FOR RAILROAD-TRAINS.

SPECIFICATION forming part of Letters Patent No. 405,964, dated June 25, 1889.

Application filed August 17, 1886. Renewed May 1, 1888. Again renewed December 13, 1888. Serial No. 293,538. (No model.)

*To all whom it may concern:*

Be it known that I, FRANK E. KINSMAN, a citizen of the United States, and a resident of New York, in the county of New York and State of New York, have invented certain new and useful Means for Automatically Controlling the Movements of Railway-Trains, of which the following is a specification.

The object of my invention is to provide a means whereby the dangers of derailment and collisions on railways may be avoided by devices automatically brought into operation by the displacement of the rails, destruction of the road-bed, misplacement of switches, the presence of two trains on the same or adjoining sections of track, or the existence of other conditions which require that a train in motion should be brought to rest in order to avoid disaster.

My invention relates, first, to means whereby the brakes of a railway-train may be automatically applied on the existence of conditions such as would require the train to be brought to rest.

My invention relates, further, to means for automatically sounding the whistle on the engine under such conditions.

In carrying out my invention I propose to employ a brake mechanism of any desired kind, whether steam, air, or electro-magnetic, and to control the action of said brake mechanism by means of an electro-magnet which is located upon the engine or other vehicle, and which is placed in a circuit on said vehicle controlled by devices on the road-bed in such way that on the occurrence of the conditions requiring the application of the brake the circuit through the magnet on the vehicle shall be automatically completed, and by said magnet the brake mechanism shall be brought into action, so as to bring the train to a stop.

My invention consists in a means for causing the brakes to be gradually applied, the essential features of which consist in the employment of a motor device of any desired kind that is connected with the brake-controlling appliance through a reducing-gear, or has its movements otherwise retarded or controlled, so that the brake-controlling appliance—such, for instance, as the controlling-cock of an air-brake—shall be moved gradually, and in controlling the action of said motor by a magnet brought into action or governed in such way as to cause the motor to operate on the occurrence of abnormal conditions requiring the application of the brake.

My invention consists, also, in certain improved details of construction, whereby the objects of my invention may be attained, and also in certain combinations of appliances for preventing accident to a railway-train, all of which will be described in connection with the accompanying drawings, and then more specifically recited in the claims.

Referring to the drawings, Figure 1 is a side elevation of a locomotive, showing apparatus located thereon suitable for use in accordance with my invention, with the combinations of circuits and appliances diagrammatically illustrated in Fig. 2. Fig. 3 is a vertical section of a circuit breaker or controller adapted for use on a railway where it is desired that the train, in passing any given point, shall open, close, or otherwise change an electric circuit. Fig. 4 is a side elevation of a device which I employ in connection with the circuits and devices of Fig. 2 for automatically restoring a relay-armature to normal position at predetermined intervals. Fig. 5 illustrates an arrangement of circuits and devices suitable for use with a railway-gate. Fig. 6 shows an arrangement that may be employed where it is desired that the setting of a signal at a junction or switch or the movement of a railway-switch shall complete or change an electric circuit so as by the device herein described to bring a train to rest. Fig. 7 illustrates diagrammatically an arrangement of circuits and devices whereby, in case a bridge takes fire or is by any means destroyed, a train shall be automatically brought to rest. Fig. 8 illustrates a modified arrangement of circuits designed for use where it is desirable to bring a train to rest in case of the displacement of a rail. Fig. 9 illustrates diagrammatically a modified arrangement of circuit-closing devices for completing the circuit to the controlling-magnet on the locomotive. Fig. 10 illustrates a modified arrangement of an apparatus for controlling the brake mechanism. Fig. 11 is a diagram of circuits and apparatus whereby a whistle may be sounded on the locomotive, and whereby, further, said whistle may be made to sound according to a signal-code. Fig. 12 shows an arrangement of circuits and devices that may be employed where it is desired to prevent the passage of a train to a section of track already occupied by another train through automatically applying the brakes or in any other desired manner bringing the train to rest or giving a warning-signal to the engineer by sounding the whistle of his engine. Fig. 13 shows a detail of construction.

As before stated, I design to employ a brake mechanism of any construction, such mechanism being controlled in its action by means of an electro-magnet on the engine or other portion of the train.

For the sake of illustration I have described my invention as applied to an ordinary steam or air brake, though I do not limit myself to such special form of brake mechanism, and I have also described an arrangement whereby the magnet applies the brakes by permitting or causing a movement of the ordinary cock or valve operated for the purpose of causing the brakes to be applied by the pressure of air. It is, however, obviously within my invention to cause the brakes to be applied by allowing the magnet to control any portion of the air-brake apparatus suitable for producing application of the brake when desired.

Fig. 2 illustrates three sections of a railway-track, (indicated at $a$ $b$ $c$, respectively.) The section $b$ $b$ has its lines of rails included in continuous electric circuits formed from a battery M B, or other source of electricity, through the relays or controlling-magnets R R, as indicated, the circuits being normally closed through the magnets, so that if a rail be displaced or the continuous circuit formed through either line of rails be interrupted from any cause, accidental or otherwise, a relay or relays R will lose their power and their armatures will drop back, so as to complete an electric circuit, which includes devices on the sections $a$ $a$ $c$ $c$, by which the electro-magnet on the locomotive may be thrown into action.

As an example of devices suitable for this purpose, I have herein illustrated short sections of rails or conducting-blocks W, which are placed on the road-bed in position to be touched by a brush T on the locomotive or other vehicle moving over the line of rails.

The generator of electricity N B$^2$, one pole of which is connected to earth or to the lines of rails $c$ $c$ $a$ $a$, has its other pole connected, through the controlling contacts of the relays R, to the short sections W W, as shown.

On the locomotive the brush T is connected to one terminal of a local circuit, the other terminal of which connects to the locomotive axles and wheels, and thence to the lines of rails, so that, as will be obvious, when the brush T strikes the block W, the circuit for any device on the locomotive will be completed and the battery M B$^2$, flowing over said circuit, will energize the magnet on the locomotive.

It is obvious that, instead of placing the battery M B$^2$ beside the track, each locomotive might carry a battery, as indicated at M B$^3$. In this case, however, the circuits shown would remain the same, the only difference being that the battery M B$^2$ would be replaced by a section of conductor completing the circuit to earth or to the lines of rails.

On the locomotive, Fig. 1, C indicates the electro-magnet, whose circuit is completed by the blocks W whenever the armature of a relay R is against a back-contact stop.

D indicates the controlling-cock for an air-brake. To this stem is secured a wheel E, that is geared to a shaft F, carrying in turn a wheel geared to a driving-wheel G, which may be a spring-driven wheel or may be driven by any other motive power. It is obvious that the wheel G might be dispensed with, the motive devices being secured to the shaft F.

Secured to the wheel E, or to the shaft therefor, is a detent-lever H, which normally engages with the armature-lever of the electro-magnet C, so that the cock is held in position where the brakes will be off. If the armature is attracted, its end is withdrawn from engagement with the detent-arm H, and the cock D is slowly turned by the motive device acting through the reducing-gear.

The gear between the motor and the cock might, it is obvious, be extended or multiplied, so as to produce an exceedingly slow motion of the cock. This is a matter to be determined by the particular circumstances of the case. The speed of movement of the cock can be determined by the natural rate of speed of the motor, by the number of reducing-gears, or by the application of any retarding device—such as a clock-escapement—applied to a wheel of the train in obvious way, as indicated in Fig. 13.

It is quite obvious that the section $b$ $b$ of the track might be provided with the circuit-closing rails W W, as indicated in dotted lines. This, however, is a matter of choice, and they may be omitted, and in fact should be, when the mechanical circuit-controllers, to be presently described, are applied to the track $b$ $b$, so as to be operated by the passage of a train.

In the arrangement of devices shown in Fig. 2 the armatures of the relays R are held up by the magnets and are permitted to recede, so as to close the circuit of battery M B$^2$ and of the magnet on the train whenever the current-flow through the magnets R is interrupted.

I prefer to so adjust the retractors for the armatures or to employ generators of so weak a power that when the armatures are retracted against their lower or circuit-closing stops they will not be drawn up again, although the circuits of the magnets R may be re-established.

In order to throw the armatures of the relays back to their normal position, I employ any suitable mechanism which acts periodically on the armatures to lift the same. This lifting action may be made to take place once in two or three minutes, or as often as is desired, or as may be determined by the length of the section of track to which the relays are connected and the time ordinarily required for a train to pass over the same. Such adjustment of the magnet or of the battery and such a lifting mechanism are designed especially for employment when there is combined with the section $b\ b$ a series of circuit-breakers operated by the passage of a train over said section, so as to bring into operation the brake mechanism for trains upon sections $a$ or $c$ before and behind the same.

In Fig. 4 I have shown a mechanism suitable for the purpose of lifting the armatures of the relays and consisting of a clock-work driving mechanism, one wheel of which carries a cam or arm I, which in its rotation lifts the armature-lever. This device is simply an exemplification of any mechanism operating periodically to lift the armature-lever into position where it can be held up by the magnet if energized.

At A A are indicated circuit-breaking devices to be operated by the passage of the train. A device suitable for such purpose is indicated in Fig. 3, and consists, essentially, of a case $B^2$, in which is a stem $A^2$, whose head is normally held by a spring $C^2$ against the bottom of a rail. On the stem or rod $A^2$ bears a spring $D^2$, normally resting against a circuit-closing portion of the spindle, and in the position of the parts illustrated the circuit is completed through the spring to the spindle, and thence to the casing $B^2$; but when the stem is depressed by the weight of a car on the rail a non-conducting portion of the spindle is brought into juxtaposition with the spring $D^2$, thus interrupting the circuit. The devices described may be set into a cavity bored in a sleeper at a point beneath the rail and suitable connections made to the spring and to the casing, so that the device will be included in the circuit with the line of rails $b$. This device is one of many that might be employed for opening the circuit including the rails $b$ on the passage of a train. Such devices are well known in railway-signaling. Any number of the circuit-breakers indicated at A may be placed in the circuits of the line of rails $b\ b$. It would be sufficient to place one only at the beginning of a section, the action of the lifting mechanism operating on the relay-levers being so adjusted as not to raise the lever until after the train would in its normal progress pass off the section. I prefer, however, to place the circuit-breakers at a number of points, such that the train will always be in action upon at least one of them, in order to provide for the contingency of a train coming to rest on the section $b\ b$.

In the normal condition of the apparatus illustrated in Figs. 1 and 2 the armature of the magnet C is depressed, so as to hold the brake out of action, and the relays R R hold their armature-levers up through the action of current from the battery M B, circulating through the line of rails $b$ and the circuit-breakers A A. The circuit to the section of rails W W is thus broken at the back contacts of the relays, and under the conditions described the magnet C will not be energized, although the brush T makes contact with a strip or rail W. If, however, either line of rails $b$ be interrupted, so as to prevent the passage of the electric current from battery M B, a relay R will lose its hold on its lever, which latter will drop back, completing a connection from a battery M $B^2$ to the sections W W, so that if at such time a brush T on a locomotive make contact with the rail W a current will flow through the electro-magnet C, and the brake will be gradually applied, gradually bringing the train to a stop. When a train passes onto the section $b\ b$, it will operate upon circuit-breakers A A, included in the circuit of the line of rails, and by interrupting the flow of current through a relay R will produce the same effect upon the circuit of battery M $B^2$, so that a train coming onto a section $a\ a$ or $c\ c$ at the same time will be brought to a stop through the energization of a controlling-magnet C on the locomotive, and the consequent release of the mechanism which operates the controlling device of the railway-brake, thus causing the latter to be applied.

It will be observed that the circuit on the section $b\ b$ serves the two purposes, first, of bringing the trains to a stop on sections $a\ a$ and $c\ c$, in case there be a train on the section $b$, and in case there be an interruption of the circuit produced by the displacement or breakage of a rail.

It is of course to be understood that the rail-circuit is, if necessary, made complete by special devices joining the abutting ends of the rails, as is sometimes done with systems of railway-signaling.

When desired, special means may be employed for making good connection between the rails and ground in order to complete the circuit for the battery or generator M $B^2$.

The diagram, Fig. 2, illustrates the application of the invention to a single line of railway and to a single section thereof. The multiplication of the devices and circuits necessary for an extended track and the curtailments which may be made in the case of a double track will be obvious to those skilled in the art.

In Fig. 5 the application of the devices shown in Figs. 1 and 2 to the case of a railway-gate is illustrated. M indicates a swinging gate, such as is sometimes employed at railway-crossings. Connected with said gate is a circuit-closing device of such nature that when the gate is up the connection from the generator M B² to the circuit-closing blocks W will be closed. A circuit-closer suitable for the purpose is typified, and consists of a stud N, carried by the gate M, and arranged so as to make contact with a spring O, suitably supported and located. It will be seen that by this arrangement, if a gateman fail to close the gate as a train approaches, the brakes will be brought into action through the completion of the circuit containing the controlling-magnet C by contact of the brush T on the blocks or plates W, a series of which latter may be located at any convenient distance on the track from the gate. A similar arrangement of devices might be employed in connection with block signaling apparatus set by hand or automatically.

The devices should obviously be so arranged that when the signals are set to "danger" the circuits will be placed in such condition that the passage of a train over a block W or similar device will complete the circuit of the electro-magnet C on the locomotive and bring the brakes into action.

The circuit closing or controlling apparatus worked by the signal apparatus may be connected with any portion thereof, and so arranged to come into action on throwing of the signal to "danger." I have in Fig. 6 illustrated it as applied to the operating-lever of the signal and as consisting of a single contact-stud on the lever and a spring arranged in the path of the same. The operation of the device is obvious. This arrangement is applicable obviously to block signaling devices on the line of road or to signaling devices such as would be employed at a railway-junction.

The lever, as shown, is designed to be typical of any one of the operating-levers used for semaphore or other signals on railways, and as the construction of such devices is well known in the art and the expedient herein described consists simply in attaching the contact stud or point to the lever and arranging a contact spring or stud in the path thereof, the special details need not be more particularly set forth.

In Fig. 7 I have illustrated an arrangement whereby in case a bridge structure takes fire a train approaching the same will be automatically brought to rest. P illustrates a bridge over which the electric circuit controlling a relay or relays R is carried in any suitable way. In the circuit on the bridge are arranged one or more thermostats sensitive to the action of heat and properly formed or constructed to rupture the circuit of the relay R.

I have in the present instance shown thermostats consisting of sections of wire Q, fusible at a comparatively low temperature. Devices suitable for the purpose are common in electric fire-alarms.

With the arrangement of the devices shown, if the bridge should get on fire, a rupture of the circuit including relay R would follow and the circuit would be closed through the circuit-closing devices W, so that, as before explained, the brakes on an approaching train would be automatically applied. The devices W may be located at any desired distance from the bridge sufficient to give the brake time to act in order to bring the train to a full stop.

Fig. 8 illustrates an arrangement of the circuits and devices whereby I am enabled to dispense with the employment of an auxiliary battery M B², as shown in Fig. 2. In this instance the circuit-closing devices W and the relay-contacts are connected into branches from one pole of the battery M B, as shown, and a ground-connection is made from the opposite pole of the battery; or said pole is connected to the line of rails of the adjoining sections $a$ $a$ $c$ $c$. With this arrangement, if the armature of a relay be against its back stop, the battery M B will serve to energize the magnet C on any locomotive that is for the time being on sections $a$ $a$ or $c$ $c$, the circuit being completed through the relay-contacts, a block W, brush T, magnet C, wheels and axles of the locomotive, and the rails.

Instead of employing a single brush T and a single block W, pairs of blocks and brushes might be employed, as indicated in Fig. 9, the circuit from a battery that is completed through the back contacts of a relay R being formed from one brush T and the contact-block with which it makes connection to a magnet C, to the other brush T, the opposite block of the pair, and back to the opposite pole of the battery.

Controlling devices suitable for employment upon the locomotive are illustrated in Fig. 10. In this instance the cock D is driven from a shaft E², which is the shaft of an electric motor driven from a dynamo or other source of current indicated at F². The circuit of the motor is completed by the action of the electro-magnet C, whose armature is made to close the circuit on its front stop. A spring-catch G² holds the armature in position to keep the circuit closed until the motor has turned the cock D sufficiently to fully apply the brakes, after which by throwing the spring-catch G² back the armature-lever may be permitted to return to its normal position. In this as in the prior case a slow and gradual movement of the cock D and a gradual application of the brakes are produced by interposing the reducing-gear consisting of the pinions on the shaft E³ and the wheel on the stem of the cock D. The electro-magnet C may be employed and brought into action in the manner already explained, for the purpose of causing the whistle or any other device for sounding a signal on the locomotive to sound in case of rupture of the line of rails, misplacement of a switch, or "danger" condition of a signal, or on the existence of other abnormal conditions indicating danger.

In Fig. 11 I have shown devices for sounding the whistle in the case of displacement or breakage of a line of rails or occurrence of other conditions of danger. I² indicates the locomotive-whistle, the controlling-cock of which (indicated at K²) is supplied with a lever L², on which acts a spring normally tending to hold the cock closed. Connected with lever L² through a link is a second lever M², upon which act cams or projections carried by a wheel H², driven by any suitable motive power. The projections carried by the wheel H² are of such length and are so disposed as to cause the whistle to sound according to any desired signal-code. The rotation of the wheel H² is controlled by the electro-magnet C acting upon suitable detent devices, consisting, for instance, of an arm carried by the wheel H² or its shaft, and engaged normally by the armature-lever of the electro-magnet C. The magnet C is on the locomotive, and has its circuit completed by devices on the road-bed after the manner before explained, or in any other suitable way, when the line of rails is ruptured, a switch misplaced, or a signal set to "danger," &c.

In the case of a misplaced switch, the devices may be made to give a signal on the locomotive which will indicate to the switch-tender that the switch is improperly placed for the approaching train.

The devices on the road-bed for closing the circuit of magnet C are of course properly located with reference to the switch, so as to give the switchman time to change the switch or to permit the engineer to bring his train to a stop before reaching the misplaced switch.

In Fig. 12 I have shown a track arrangement for bringing a train to a stop when it is approaching a section upon which there is another train. The arrangement is one suitable for double-track roads. The section of rails b b serves to complete the circuit of the battery M B through the relay R, the battery M B having its poles connected, respectively, to the opposite rails at one end of the section, and the relay R having its terminals connected, respectively, to the opposite rails also. The relay R normally holds its armature-lever up, so as to open the connection from the circuit-closing devices W; but when the magnet R loses its power, either by breakage of a rail b or by short-circuiting of battery M B through presence of a train on the track b b, the armature of the lever falls back and the magnet C on an approaching train will be energized or have its circuit completed through contact of its brush T with the block W, the circuit being in such case from earth or near the battery M B², thence to battery M B², through the contacts of relay R, a block W, brush T, magnet C, and axles of the locomotive, rails a, and to earth.

It is obvious that in place of the circuit-closing devices described for completing the circuit of the magnet C on the locomotive other means known in the art might be employed.

It is obvious that the arrangement shown in Fig. 7 is not only useful in case of fire, but would also serve to automatically apply the brakes if the bridge should be carried away by a freshet or be destroyed from other cause.

The various arrangements of devices and currents herein described might be also applied to automatically shut off the steam or other motive power.

I contemplate in some cases sounding the whistle or bell and applying the brakes or cutting off the steam simultaneously and automatically. This would involve simply the control of two sets of devices proper for the purpose by the electro-magnet C; or, if desired, the same mechanism released by the magnet C might perform the two offices. For instance, as indicated in Fig. 11, B⁶ might be an air-brake pipe having a cock operated by a wheel of the train that operates the whistle.

I do not limit myself to any particular way of completing the circuits to the batteries, as the return-circuits might be either by the earth, by separate return-wires, or even by the rails.

The magnet C, Fig. 12, may control the operation of cock D or other device in the manner already explained, for the purpose of automatically applying the brakes, or for the purpose of sounding the whistle, as already explained, or for shutting off the steam.

What I claim as my invention is—

1. The combination, with the controlling device for a railway-brake, of a governing electro-magnet on the locomotive or other vehicle, a relay electro-magnet whose circuit includes the rails of a section of track, and a relayed circuit governed by said magnet and formed through devices on the road-bed, and a section of conductor located on the vehicle and containing the controlling-magnet of the brake mechanism.

2. The combination, with a railway-brake, of a controlling-cock, a driving mechanism, a reducing-gear between said driving mechanism and the cock, and a governing electro-magnet whereby, when the magnet throws the driving mechanism into operation, a gradual application of the brakes may be produced.

3. The combination, with a railway-brake mechanism, of a controlling-cock, a driving-power, an intermediate reducing-gear, a governing electro-magnet on the locomotive or other portion of the train, and means controlled by said magnet for throwing the driving-power into operation.

4. The combination, with a railway-brake, of a controlling-cock, a driving-power, means connected with the same for giving a graduated movement to the cock under the operation of the driving-power, and a governing electro-magnet whereby, through the operation of the magnet, a gradual application of the brakes may be secured.

5. The combination, with a relay whose coils include the rails of a section of track, of a relayed circuit completed through the back contact of the armature, and means for periodically lifting the armature away from its circuit-closing stop.

6. The combination, with a railway-brake mechanism and a controlling-magnet therefor, of a circuit for said magnet including the back contacts of a relay, and means for periodically lifting the relay from its back-contact stop.

7. The combination of a cock on a railway-vehicle, a magnet controlling the operation of the same, a circuit for said magnet including the back contacts of a relay, a circuit for said relay governed by the passage of a train over a section of track, and means for periodically restoring the armature of the relay to normal position, as and for the purpose described.

8. The combination of a relay in a normally-closed circuit, including circuit-breakers operated by the passage of a train, and means for periodically lifting the armature of the relay from its back contact.

9. The combination, with a railway-gate, of a circuit-controller therefor, a railway-brake mechanism, an electro-magnet governing the same and placed on the locomotive, and circuit-closing devices on the road-bed for completing the circuit of said magnet on the vehicle or locomotive when the gate is open.

10. The combination, with a railway-bridge, of an electric circuit passing over the same and including one or more thermostats, a cock on the locomotive or railway-train, and a controlling-magnet for the same governed by the condition of the circuit upon the bridge, whereby on the action of the thermostat device a cock may be turned through the controlling agency of the electro-magnet, as and for the purpose described.

11. The combination, with a railway-bridge, of a thermostat-circuit passing over the same, a locomotive or railway-vehicle carrying an electro-magnet whose circuit is governed by the condition of the thermostat-circuit, a railway-brake mechanism, and a controlling-cock therefor governed by said electro-magnet.

12. The combination, with a railway-bridge, of a thermostat-circuit, a railway-brake mechanism, a controlling-cock for the same, the governing electro-magnet on the locomotive or other vehicle, and a circuit for said magnet governed by the condition of the thermostat-circuit and the position of the locomotive with regard to circuit-closing devices on the road-bed.

13. The combination, with the controlling mechanism for a locomotive-whistle, of operating devices for actuating the same according to a signal-code, and a controller-magnet, as and for the purpose described.

14. The combination, with the controlling devices for a steam-whistle on a locomotive, of a driving-wheel carrying operating projections disposed and constructed in accordance with a signal-code, and an electro-magnet governing the operations of said wheel, as and for the purpose described.

15. The combination, on a locomotive, of a steam-whistle, governing devices therefor, a wheel $H^2$, carrying projections whose length and intervals correspond to a signal-code, a detent mechanism governing the rotation of the wheel, and a controlling electro-magnet on the vehicle having a circuit completed through devices on the road-bed.

16. The combination, with a locomotive-whistle and a controlling-magnet therefor, of a relay governing the action of said magnet, and a circuit for the relay including the rails of a railway-track.

17. The combination, with a relay R and a section of track $b\ b$, the rails of which are included in a circuit with the relay, of one or more track-circuit breakers normally closed, but arranged in the circuit and in position to be operated by a passing train.

18. The combination, with a line of rails $b$, included in the circuit of the relay R, of one or more circuit-breaking devices interposed in said circuit for interrupting the relay-circuit on the passage of a train over the section of track.

19. The combination, with the cock D and its driving electromotor, of a controlling-magnet and a catch for holding the circuit of the motor closed, as and for the purpose described.

20. The combination, with a railway-car brake, of a controlling-cock, an electric motor geared to the same, a governing-magnet, a relay-armature for the same normally retracted, and a catch for holding the armature up and in position to close the circuit of the motor, as and for the purpose described.

Signed at New York, in the county of New York and State of New York, this 29th day of July, A. D. 1886.

FRANK E. KINSMAN.

Witnesses:
WM. H. CAPEL,
E. J. GRISWOLD.